United States Patent [19]

Hoeschele

[11] 4,185,003

[45] Jan. 22, 1980

[54] STABILIZED COPOLYETHERESTERS

[75] Inventor: Guenther K. Hoeschele, Wilmington, Del.

[73] Assignee: E. I. Du Pont de Nemours and Company, Wilmington, Del.

[21] Appl. No.: 878,619

[22] Filed: Feb. 16, 1978

[51] Int. Cl.² .................... C08K 5/13; C08K 5/34
[52] U.S. Cl. .................... 260/45.8 N; 260/45.8 NT; 260/45.9 NC; 260/45.95 R; 528/274; 528/301
[58] Field of Search .......... 260/45.8 NP, 45.9 NC, 260/293.64; 528/274, 301

[56] References Cited

U.S. PATENT DOCUMENTS

| | | | |
|---|---|---|---|
| 3,493,633 | 2/1970 | Lange | 260/45.8 NT |
| 3,584,047 | 6/1971 | Dexter et al. | 260/45.9 NC |
| 3,640,928 | 2/1972 | Murayama et al. | 260/45.8 NP |
| 3,660,438 | 5/1972 | Dexter | 260/45.9 NC |
| 3,763,109 | 10/1973 | Witsiepe | 260/45.7 R |
| 3,850,877 | 11/1974 | Cook | 260/45.8 NP |
| 3,860,558 | 1/1975 | Klemchuk | 260/45.9 NC |
| 3,896,078 | 7/1975 | Hoeschele | 260/45.9 NC |
| 3,993,655 | 11/1976 | Rasberger et al. | 260/45.8 NP |
| 4,051,196 | 9/1977 | Wells et al. | 260/45.9 NC |

Primary Examiner—Hosea E. Taylor
Assistant Examiner—R. A. White

[57] ABSTRACT

Thermoplastic copolyetherester elastomers are stabilized against heat and light aging by incorporating into the copolyetherester effective concentrations of a phenolic antioxidant and a hindered amine photostabilizer of the formula

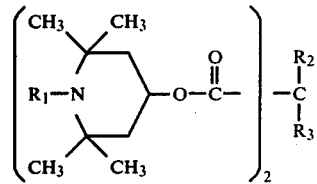

where $R_1$ is hydrogen or an alkyl radical of 1–12 carbon atoms, $R_2$ and $R_3$ are alkyl radicals of 1–12 carbon atoms, benzyl, or 3,5-di-tert-butyl-4-hydroxybenzyl.

13 Claims, No Drawings

STABILIZED COPOLYETHERESTERS

BACKGROUND OF THE INVENTION

Thermoplastic copolyetherester elastomers form a highly useful class of polymers because of their outstanding physical properties and excellent processing behavior. However, it is known that the copolyetheresters are highly susceptible to oxidative degradation induced by exposure to heat or light. Thermally induced oxidative degradation is described in a paper by G. K. Hoeschele, Angewandte Makromolekulare Chemie, 58/59, pps. 299–319 (1977), which reports complete degradation of unstabilized copolyetheresters within 24 hours at 121° C. The rapidity of light induced oxidative degradation is evidenced by the complete failure of 0.25 mm films of copolyetheresters after about 6 weeks exposure behind glass to northern sky light.

The classical solution to instability problems of the type exhibited by copolyetheresters has been to add a combination of an antioxidant and a UV-absorber. Such measures generally have been found to be adequate in related polymers such as polyether-based polyurethanes. In contrast to the polyurethanes, copolyetheresters respond to only a limited extent to the combination of antioxidant and UV-absorber. This contrasting behavior is further evidence of the unusual susceptibility of copolyetheresters to oxidative degradation.

Relatively recently, a new class of highly effective photostabilizers, characterized by the presence of hindered piperidine moieties, has become available. A number of such photostabilizers have been evaluated in copolyetheresters where their performance as photostabilizers is good. Japanese patent application Publication No. 75/91652 discloses the use of a number of hindered piperidine type photostabilizers in combination with phenolic antioxidants in copolyetheresters. It has been found that when one follows the teaching therein, photostabilization of the copolyetherester is indeed improved; however, heat-aging behavior is much poorer when the photostabilizer is present compared to performance in the absence of the photostabilizer. This deficiency cannot be corrected by simply increasing the concentration of phenolic antioxidant. Thus a need for copolyetherester compositions which simultaneously provide outstanding heat and light aging performance still exists.

SUMMARY OF THE INVENTION

A novel copolyetherester composition, containing a hindered amine photostabilizer and a phenolic antioxidant has been discovered that has outstanding resistance to degradation due to heat and light aging. More specifically, this invention is directed to a copolyetherester composition stabilized against oxidative degradation due to exposure to heat and light, said composition consisting essentially of a copolyetherester consisting essentially of a multiplicity of recurring long chain ester units and short chain ester units joined head-to-tail through ester linkages, said long chain ester units being represented by the formula

and said short chain ester units being represented by the formula

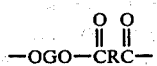

where G is a divalent radical remaining after the removal of terminal hydroxyl groups from a poly(alkylene oxide) glycol having a number average molecular weight of about 400–6000 and a carbon to oxygen atomic ratio of about 2.5–4.3; R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; provided said short chain ester units amount to about 15–95 percent by weight of said copolyetherester, and effective concentrations of a phenolic antioxidant and a hindered amine photostabilizer of the formula

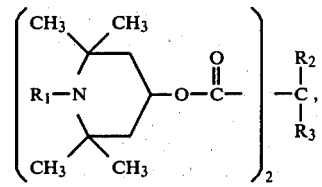

where $R_1$ represents hydrogen or an alkyl radical of 1–12, preferably 1–4, carbon atoms and $R_2$ and $R_3$ represent an alkyl radical of 1–12, preferably 1–6, carbon atoms, benzyl, or 3,5-di-tert-butyl-4-hydroxybenzyl.

Preferred stabilized copolyetherester compositions can be prepared by reacting said poly(alkylene oxide) glycol, said dicarboxylic acid and said diol in the presence of effective amounts of a phenolic antioxidant that is stable and substantially nonvolatile during polymerization and a hindered amine photostabilizer having the formula

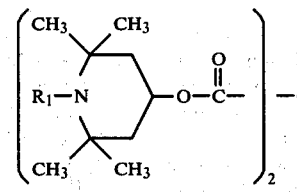

where the R substituents have the same meaning as indicated above. The compositions can also be prepared by addition of antioxidant and/or photostabilizer to the copolyetherester after polymerization.

DETAILED DESCRIPTION OF THE INVENTION

The novel stabilized copolyetherester has incorporated therein effective amounts of a hindered amine photostabilizer and a phenolic antioxidant. It is the combination of hindered amine photostabilizer and phenolic antioxidant that results in a copolyetherester that shows excellent resistance to oxidative degradation caused by exposure to heat and light heretofore not exhibited by other copolyetheresters.

The term "long-chain ester units" as applied to units in a polymer chain of the copolyetherester that is stabilized refers to the reaction product of a long-chain glycol with a dicarboxylic acid. Such "long-chain ester units", which are a repeating unit in the copolyetheresters, correspond to formula (I) above. The long-chain glycols are polymeric glycols having terminal (or as nearly terminal as possible) hydroxy groups and a molecular weight from about 400–6000. The long-chain glycols used to prepare the copolyetheresters are poly(alkylene oxide) glycols having a carbon-to-oxygen atomic ratio of about 2.5–4.3. Representative long-chain glycols are poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide.

The term "short-chain ester units" as applied to units in a polymer chain of the copolyetherester that is stabilized refers to low molecular weight chain units having molecular weights less than about 550. They are made by reacting a low molecular weight diol (below about 250) with an aromatic dicarboxylic acid having a molecular weight below about 300, to form ester units represented by formula (II) above.

The term "low molecular weight diols" as used herein should be construed to include equivalent ester-forming derivatives, provided, however, that the molecular weight requirement pertains to the diol only and not to its derivatives.

Preferred are diols with 2–15 carbon atoms such as ethylene, propylene, tetramethylene, pentamethylene, 2,2-dimethyltrimethylene, hexamethylene, and decamethylene glycols, dihydroxycyclohexane, cyclohexane dimethanol.

The term "dicarboxylic acids" as used herein, includes equivalents of dicarboxylic acids having two functional groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyetherester polymers that are stabilized, those with 8–16 carbon atoms are preferred, particularly the phenylene dicarboxylic acids, i.e., phthalic, terephthalic and isophthalic acids and their dimethyl esters.

The short-chain ester units will constitute about 15–95 weight percent of the copolyetherester. The remainder of the copolyetherester will be long-chain ester units comprising about 5–85 weight percent of the copolyetherester.

Preferred copolyetheresters which are stabilized by the addition of the photostabilizer and antioxidant are those prepared from dimethyl terephthalate, 1,4-butanediol, and poly(tetramethylene oxide) glycol having a molecular weight of about 600–2000. Optionally, up to about 30 mole % of the dimethyl terephthalate in these polymers can be replaced by dimethyl phthalate or dimethyl isophthalate.

The dicarboxylic acids or their derivatives and the polymeric glycol are incorporated into the copolyetherester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

The copolyetheresters described herein are made by a conventional ester interchange reaction which, preferably takes place in the presence of a phenolic antioxidant that is stable and substantially nonvolatile during the polymerization and a hindered amine photostabilizer. Surprisingly and advantageously, the instant photostabilizers which are esters do not undergo ester interchange to a significant extent under the rather rigorous polymerization conconditions and the resulting product is substantially colorless.

A preferred procedure involves heating the dimethyl ester of terephthalic acid with a long-chain glycol and 1,4-butanediol in a molar excess and a phenolic antioxidant and hindered amine photostabilizer in effective concentrations in the presence of a catalyst at about 150°–260° C. and a pressure of 0.05 to 0.5 MPa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyetherester by distillation of the excess of short-chain diol. The second process stage is known as "polycondensation".

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. The preferred phenolic antioxidant and hindered amine photostabilizer can be introduced at any stage of copolyetherester formation or after the polymer is prepared. As indicated above, preferably, the phenolic antioxidant and photostabilizer are added with the monomers. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparation. Polycondensation of prepolymer already containing the phenolic antioxidant and hindered amine photostabilizer can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer.

A detailed description of suitable copolyetheresters that can be stabilized by the phenolic antioxidant and hindered amine light stabilizer and procedures for their preparation are described in U.S. Pat. Nos. 3,023,192, 3,651,014, 3,763,109, and 3,766,146, the disclosures of which are incorporated herein by reference.

The copolyetherester is stabilized against oxidative degradation due to exposure to heat and light by incorporating in the polymer effective concentrations of a phenolic antioxidant and a hindered amine photostabilizer. The hindered amine photostabilizer has the formula

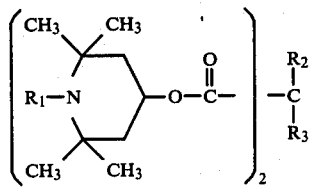

where $R_1$ represents hydrogen or an alkyl radical of 1-12, preferably 1-4, carbon atoms and $R_2$ and $R_3$ represents an alkyl radical of 1-12, preferably 1-6, carbon atoms, benzyl, or 3,5-di-tert-butyl-4-hydroxybenzyl. Photostabilizers in which at least one of $R_2$ and $R_3$ is a 3,5-di-tert-butyl-4-hydroxybenzyl radical are especially preferred. Examples are bis(1,2,2,6,6-pentamethyl-4-piperidinyl)-n-butyl-(3,5-di-tert-butyl-4-hydroxybenzyl)malonate and bis(2,2,6,6-tetramethyl-4-piperidinyl) bis(3,5-di-tert-butyl-4-hydroxybenzyl)malonate. Generally, up to 3% by weight of the copolyetherester of photostabilizer is added to effectively stabilize the copolyetherester, although the particular amount incorporated in the composition depends on the degree of protection desired. Usually, amounts incorporated in the copolyetherester are from about 0.05-2% by weight based on the weight of the copolyetherester. The photostabilizer can be added with the monomers prior to polymerization of the copolyetherester and, quite surprisingly, these photostabilizers do not decompose during the polymerization reaction. Alternatively, the photostabilizers can be added to the molten copolyetherester immediately after polymerization is complete or subsequently by melt blending.

The hindered amines used as photostabilizers for the copolyeteresters described herein are known compounds and are prepared, for example, by base-catalyzed transesterification of diethyl malonate with 2 moles of a 4-hydroxytetramethylpiperidine, followed by C-alkylation of the resulting malonate either by the classical method involving reaction of alkyl halides with the sodium derivative of the malonate or by base-catalyzed reaction of the malonate with N-dialkyl-S-(3,5-di-tert-butyl-4-hydroxybenzyl) dithiocarbaminate or N-(3,5-di-tert-butyl-4-hydroxybenzyl) dialkylamine. These hindered amines are also described in Rasberger et al., U.S. Pat. No. 3,993,655 and German Publication Nos. 2,647,452 and 2,718,458. Representative hindered amines that are used as stabilizers in the invention include bis(1,2,2,6,6-pentamethyl-4-piperidinyl) n-butyl(3,5-di-tert-butyl-4-hydroxybenzyl)malonate; bis(1,2,2,6,6-pentamethyl-4-piperidinyl dibenzylmalonate; bis(1,2,2,6,6-pentamethyl-4-piperidinyl) bis(3,5-di-tert-butyl-4-hydroxybenzyl)malonate; bis(1,2,2,6,6-pentamethyl-4-piperidinyl) diethylmalonate; bis(1,2,2,6,6-pentamethyl-4-piperidinyl) n-dodecyl(3,5-di-tert-butyl-4-hydroxybenzyl)malonate; bis(2,2,6,6-tetramethyl-4-piperidinyl) bis(3,5-di-tert-butyl-4-hydroxybenzyl)malonate; bis(2,2,6,6-tetramethyl-4-piperidinyl) dibenzylmalonate; bis(2,2,6,6-tetramethyl-4-piperidinyl) benzylethylmalonate; and bis(2,2,6,6-tetramethyl-4-piperidinyl) n-butyl(3,5-di-tert-butyl-4-hydroxybenzyl)malonate.

As previously indicated, the present invention involves the use of an effective amount, e.g., usually up to 5% by weight of the copolyetherester, of a phenolic antioxidant in addition to the hindered amine photostabilizer. Usually, the amount of antioxidant added to and incorporated in the copolyetherester is from about 0.1-2% by weight of copolyetherester. As is the case with the hindered amine photostabilizer, the preferred phenolic antioxidants can be added with the monomers prior to the formation of the copolyetherester polymer or, if desired, the phenolic antioxidants can be added to the molten polymer after polymerization has been completed. Phenolic antioxidants which are too volatile or unstable for addition during the polymerization should be added to the finished polymer by melt blending. It is preferred to add the phenolic antioxidant with the monomers before polymerization begins.

Phenolic antioxidants are generally characterized by the presence of one or more radicals having the formula

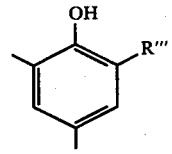

wherein $R'''$ is a secondary or more preferably a tertiary alkyl group. Representative phenolic antioxidants include:

Monohydric phenols such as 2,6-di-tert-butyl-4-methyl-phenol, butylated p-phenyl-phenol and 2-(α-methylcyclohexyl)-4,6-dimethylphenol;

Bis-phenols such as 2,2'-methylenebis-(6-tert-butyl-4-methylphenol), 4,4'-bis(2,6-di-tert-butylphenol), 4,4'-methylenebis(6-tert-butyl-2-methylphenol), 4,4'-butylenebis(6-tert-butyl-3-methylphenol), 4,4'-methylenebis(2,6-di-tert-butylphenol), 4,4'-thiobis(6-tert-butyl-2-methylphenol), 2,2'-thiobis(4-methyl-6-tert-butylphenol), 1,6-hexamethylenebis(3,5-di-tert-butyl-4-hydroxyhydrocinnamate) and thiodiethylenebis(3,5-di-tert-butyl-4-hydroxyhydrocinnamate);

Poly-phenols such as 1,3,5-tris(3,5-di-tert-butyl-4-hydroxy hydrocinnamoyl)-hexahydro-s-triazine, 1,3,5-trimethyl-2,4,6-tris(3,5-di-tert-butyl-4-hydroxybenzyl) benzene, tri(3,5-di-tert-butyl-4-hydroxyphenyl) phosphite and tetrakis[methylene(3,5-di-tert-butyl-4-hydroxyhydrocinnamate)] methane; and Amide-containing phenolic antioxidants such as those described in U.S. Pat. No. 3,584,047. These materials are characterized by the presence of from 1 to 4 amide linkage-containing moieties having the following general structure:

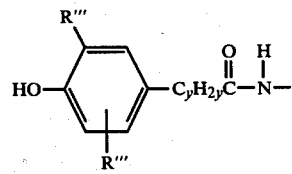

wherein $R'''$ is secondary or tertiary alkyl, $R''''$ is hydrogen or alkyl, y is zero to six. Preferred antioxidants of this type are N,N'-hexamethylene bis(3,5-di-tert-butyl-4-hydroxyhydrocinnamamide) and N,N'-trimethylene bis(3,5-di-tert-butyl-4-hydroxyhydrocinnamamide).

Of the phenolic antioxidants, N,N'-hexamethylene bis(3,5-di-tert-butyl-4-hydroxyhydrocinnamamide) and N,N'-trimethylene bis(3,5-di-tert-butyl-4-hydroxyhydrocinnamamide) are especially preferred. Mixtures of these two antioxidants can be used to advantage to minimize or eliminate blooming which may be encountered when only one stabilizer is used at the same level.

Properties of these copolyetherester compositions can be modified by incorporation of various conventional organic fillers, such as carbon black, silica gel, alumina, clays and chopped fiber glass. The incorporation of pigments in small amounts substantially improves the light stability of these compositions. Improvements in light stability can also be obtained by adding suitable UV-absorbers such as 2-(3',5'-di-tert-butyl-2'-hydroxyphenyl)-5-chlorobenzotriazole and 2(2'-hydroxy-5'-methylphenyl) benzotriazole.

The following ASTM methods are employed in determining the properties of the polymers prepared in the examples which follow:

| | |
|---|---|
| Modulus at 100% elongation,* $M_{100}$ | D 412 |
| Modulus at 300% elongation,* $M_{300}$ | D 412 |
| Modulus at 500% elongation,* $M_{500}$ | D 412 |
| Tensile at Break,* $T_B$ | D 412 |
| Elongation at Break,* $E_B$ | D 412 |
| Hardness, Shore D and Shore A | D 2240 |
| Heat Aging** | D 865 |
| Weather-Ometer Aging*** | D 750 |
| Melt Index**** | D 1238 |

*Cross-head speed 50.8 cm/min.
**All heat aging experiments were carried out with dumbbell shaped test specimens as described in ASTM D 412. If not stated otherwise, the thickness of the test specimens was 0.9–1.0 mm.
***If not mentioned otherwise, dumbbells cut out from 0.25 mm thick films are used for Weather-Ometer aging.
****2160 g load, drying conditions: 1 hr. at 135° C./27Pa The inherent viscosity is determined at a concentration of 0.1 g/dl in m-cresol at 30° C. and is expressed in dl/g.

The useful polymer life at the specified aging temperatures is determined by the 180° bend test. In this test the dumbbell shaped test specimen as described in ASTM Method D 412, is removed from the heat aging tubes and kept at room temperature for about 10 minutes. Then the dumbbell is bent first in one direction until its ends touch each other and then bent in the opposite direction until the ends touch again. If the test specimen breaks during this procedure, it is said to have failed in the 180° bend test.

The following light stabilizers are used in the examples shown below:

| Designation | Chemical Composition |
|---|---|
| Stabilizer A | Bis(1,2,2,6,6-pentamethyl-4-piperidinyl) n-butyl-(3,5-di-tert.-butyl-4-hydroxy benzyl)malonate |
| Stabilizer B | Bis(2,2,6,6-tetramethyl-4-piperidinyl) bis(3,5-di-tert.-butyl-4-hydroxy benzyl)malonate |
| Stabilizer C | Bis(1,2,2,6,6-pentamethyl-4-piperidinyl) dibenzylmalonate |

For control purposes bis(2,2,6,6-tetramethyl-4-piperidinyl) sebacate—available from Ciba-Geigy Corp. as "Tinuvin" 770—is used.

The following catalyst is used in preparing the copolyesters of the examples:

CATALYST

To 425 parts of anhydrous 1,4-butanediol in a round bottom flask is added 23.32 parts of tetrabutyl titanate. The mixture is agitated at 50° C. for 2–3 hours until the small amount of solids originally present disappears.

Copolyester A is prepared by placing the following materials in an agitated flask fitted for distillation:

| | | |
|---|---|---|
| Poly(tetramethylene oxide) glycol number average molecular weight 991 | 20.18 | parts |
| Dimethyl terephthalate | 34.87 | parts |
| 1,4-butanediol | 20.2 | parts |
| N,N'-hexamethylene bis (3,5-di-tert.-butyl-4-hydroxy-hydrocinnamamide) | 0.12 (0.2%)* | parts |
| Catalyst | 1.4 | parts |

*Based on theoretical polymer yield

A stainless steel stirrer with a paddle cut to conform with the internal radius of the flask is positioned about 3 mm from the bottom of the flask and agitation is started. The flask is placed in an oil bath at 160° C., agitated for five minutes and then the catalyst is added. Methanol distills from the reaction mixture as the temperature is slowly raised to 250° C. over a period of one hour. When the temperature reaches 250° C., the pressure is gradually reduced to < 135 Pa within 20 minutes. The polymerization mass is agitated at 250° C./<135 Pa for 44 minutes. Then the polycondensation polymerization is discontinued by releasing the vacuum under nitrogen and the resulting viscous molten product is scraped from the flask in a nitrogen (water and oxygen free) atmosphere and allowed to cool. The resulting polymer has an inherent viscosity of 1.38 dl/g and a melt index of 9.0 g/10 min. (measured at 220° C.). After shredding the polymer is extruded at 220° C. to a 3–4 mm strand and granulated.

Copolyester B is prepared according to the following procedure:

In an agitated flask fitted with a distillation column 25.0 parts of ethylene glycol, 37.3 parts of dimethyl terephthalate and 0.12 parts of N,N'-hexamethylene bis(3,5-di-tert.-butyl-4-hydroxy-hydrocinnamamide) and 1.4 parts catalyst are agitated and heated at such a rate that the temperature at the head of the distillation column is maintained at 70° C. while methanol is removed. When substantially all of the methanol is distilled out of the reaction mixture, the head temperature rises abruptly to about 180° C. Heating and distillation continues until the temperature in the reactor reaches 230° C. The reaction mixture is allowed to cool to 185° C. and 22.3 parts of poly(tetramethylene oxide) glycol having a number average molecular weight of 991 is added. The reaction flask is then immersed in a 250° C. oil bath and the mixture agitated for 5 minutes under nitrogen. While maintaining an oil bath temperature of 250° C., the pressure is step-wise reduced to 25–65 Pa and the distillate consisting essentially of ethylene glycol collected in a cold trap. After stirring for about 60 minutes the copolyester is isolated as described above for Copolyester A. The resulting polymer has an inherent viscosity of 1.31 dl/g and a Shore D hardness of 55.

EXAMPLE 1

The following procedure is used for the preparation of the stabilized copolyester compositions of this example:

Copolyester A is blended for several hours by rolling first with 0.05% Sandozin D 100—a nonionic alkyl phenol polyether glycol liquid wetting agent available from Sandoz Inc., Hanover, N.J.—and then with 0.6% of one of the hindered amine photostabilizers listed above. Finally, the dry-blend is mixed in a single screw extruder at 220°–240° C., extruded to a 3–4 mm strand and granulated.

The following compositions are prepared in this manner:

(A) Copolyester A containing 0.6% Stabilizer A
(B) Copolyester A containing 0.6% Stabilizer B
(C) Copolyester A containing 0.6% Stabilizer C For control purposes Copolyester A is mixed with 0.6% bis(2,2,6,6-tetramethyl-4-piperidinyl) sebacate according to the procedure shown above. This copolyester serves as a control polymer for a light-stabilized copolyester composition (C-1). As a control polymer containing only a phenolic antioxidant as stabilizer Copolyester A is used (C-2).

For Weather-Ometer (WOM) aging tests 0.25 mm films are compression molded at 215° C., for heat aging experiments 1.0 mm slabs are prepared at the same temperature. The physical properties of all three compositions before and after aging for the period specified is shown in Table I.

and C, exhibit a satisfactory combination of good weatherability and heat aging characteristics. Control Polymer C-1, although effectively stabilized against light induced degradation, is greatly deficient in respect to heat aging. Control Polymer C-2 on the other hand possesses superior heat aging characteristics, but it is readily degraded when exposed to light.

When the above photostabilizers are incorporated into Copolyester B according to the procedure of Example 1 similar results in respect to weathering and heat aging resistance as reported for Copolyester A are obtained.

EXAMPLE 2

(A) The procedure for the preparation of Copolyester A is repeated except that 0.58 parts of Stabilizer A is charged to the reactor together with the other starting materials.

(B) The procedure of Example 2A is repeated except that the same amount of Stabilizer B is used instead of Stabilizer A.

The resulting copolyester compositions 2A and 2B are white in color, comparable to the whiteness of the corresponding copolyesters of Example 1.

(C) For control purposes the preparation of Polymer 2A and 2B is repeated except that the phenolic antioxidant (N,N'-hexamethylene bis(3,5-di-tert.-butyl-4-hydroxy-hydrocinnamamide) is omitted.

The four copolyester compositions are aged in the Weather-Ometer and in tubes at 121° C. as described in Example 1. The useful life of these polymers at 121° C. is determined by the 180° bend test.

TABLE I

| | Polymer A | | Polymer B | | Polymer C | | Control Polymer C-1 | | Control Polymer C-2 | |
|---|---|---|---|---|---|---|---|---|---|---|
| Original Properties | | | | | | | | | | |
| $M_{100}$, MPa | 17.2 | | 17.0 | | 17.2 | | 17.1 | | 17.3 | |
| $M_{300}$, MPa | 18.3 | | 18.4 | | 18.3 | | 18.3 | | 18.6 | |
| $T_B$, MPa | 43.2 | | 42.5 | | 43.0 | | 40.2 | | 45.9 | |
| $E_B$, % | 700 | | 680 | | 730 | | 680 | | 750 | |
| Shore D Hardness | 55 | | 55 | | 55 | | 55 | | 55 | |
| Properties After WOM Aging (0.25 mm thickness) | $T_B$ MPa | $E_B$ % | $T_B$ MPa | $E_B$ % | $T_B$ MPa | $E_B$ % | $T_B$ MPa | $E_B$ % | $T_B$ MPa | $E_B$ % |
| 15 hrs. | — | — | — | — | — | — | — | — | 15.5 | 20 |
| 40 hrs. | — | — | — | — | — | — | 22.1 | 390 | degraded** | |
| 60 hrs. | 22.7 | 400 | 19.6 | 320 | 20.0 | 280 | — | — | — | |
| 100 hrs. | 18.9 | 380 | 17.9 | 50 | 18.7 | 50 | 17.2 | 60 | — | |
| 150 hrs. | 17.2 | 50 | 18.6 | 50 | 19.3 | 50 | 18.3 | 60 | — | |
| Properties After Heat Aging at 121° C. (1 mm thickness) | | | | | | | | | | |
| 4 days | — | | — | | — | | 28.9 | 650 | — | |
| 7 days | 28.3 | 670 | 27.6 | 740 | 27.6 | 720 | F* | | — | |
| 10 days | — | — | — | — | 20.0 | 190 | — | | — | |
| 2 weeks | 26.9 | 600 | 24.1 | 610 | F* | | — | | 37.7 | 800 |
| 3 weeks | 26.2 | 630 | 16.5 | 80 | — | | — | | 27.6 | 760 |
| 4 weeks | 13.8 | 10 | 12.6 | 10 | — | | — | | — | |
| 5 weeks | F* | | F* | | — | | — | | 25.5 | 560 |
| 7 weeks | — | | — | | — | | — | | F* | |

*Failure in 180° bend test
**Sample completely destroyed

It is evident from these data that only the polymer compositions of this invention, namely Polymer A, B

TABLE II

|  | Polymer 2A | Control Polymer 2A (without antioxidant) | Polymer 2B | Control Polymer 2B (without antioxidant) |
|---|---|---|---|---|
| Original Properties | | | | |
| $M_{100}$, MPa | 17.0 | 17.2 | 17.1 | 17.3 |
| $M_{300}$, MPa | 18.4 | 18.5 | 18.3 | 18.6 |
| $T_B$, MPa | 40.1 | 38.7 | 42.5 | 39.7 |
| $E_B$,% | 680 | 700 | 710 | 690 |
| Shore D Hardness | 55 | 55 | 55 | 50 |

| Properties After WOM Aging | $T_B$ MPa | $E_B$ % | $T_B$ MPa | $E_B$ % | $T_B$ MPa | $E_B$ % | $T_B$ MPa | $E_B$ % |
|---|---|---|---|---|---|---|---|---|
| 60 hrs. | 23.5 | 380 | 21.7 | 410 | 21.0 | 380 | 22.5 | 350 |
| 100 hrs. | 19.0 | 100 | 16.8 | 40 | 17.6 | 50 | 18.8 | 30 |
| 150 hrs. | 17.7 | 40 | 17.2 | 40 | 18.6 | 30 | 15.9 | 20 |

| Polymer Life at 121° C. | | | | | | | | |
|---|---|---|---|---|---|---|---|---|
| (days) | 36 | | 13 | | 40 | | 17 | |

The data summarized in Table II clearly show the importance of using an antioxidant in addition to the light stabilizer to achieve satisfactory protection of polyether esters against light and heat induced degradation.

EXAMPLE 3

The procedure for the preparation of Copolyester A is repeated except that the following starting materials are used:

|  | Polymer 3A | Polymer 3B |
|---|---|---|
| Poly(tetramethylene oxide) glycol, parts (number average molecular weight 991) | 27.12 | 9.48 |
| Dimethyl terephthalate, parts | 24.24 | 45.0 |
| Dimethyl isophthalate, parts | 7.05 | — |
| 1,4-butanediol, parts | 17.3 | 30.0 |
| N,N'-hexamethylene bis(3,5-di-tert.-butyl-4-hydroxy-hydrocinnamamide), parts | 0.13 | 0.12 |
| Stabilizer A, parts | 0.3* | 0.3* |
| Catalyst, parts | 1.4 | 1.4 |

*0.5% based on theoretical polymer yield

For control purposes the preparation of both polymer compositions is repeated except that Stabilizer A is omitted.

0.25 mm thick test specimens of Copolyester 3A and 3B are aged in the Weather-Ometer (WOM), side-by-side with the corresponding control polymers. The physical properties of all four compositions before and after aging are shown in Table III.

TABLE III

|  | Polymer 3A | Control Polymer 3A Without Light Stabilizer A | Polymer 3B* | Control Polymer 3B* Without Light Stabilizer A |
|---|---|---|---|---|
| Original Properties | | | | |
| $M_{100}$, MPa | 6.6 | 6.7 | 24.8 | 24.6 |
| $M_{300}$, MPa | 8.6 | 8.8 | 28.6 | 28.5 |
| $T_B$, MPa | 44.5 | 32.9 | 41.4 | 39.7 |
| $E_B$, % | 850 | 830 | 390 | 380 |
| Shore D Hardness | 40 | 40 | 72 | 72 |
| Properties After WOM Aging ($T_B$[MPa]/$E_B$[%]) | | | | |
| 20 hrs. | 41.4/720 | 7.6/220 | — | 31.0/20 |
| 30 hrs. | — | F** | — | 30.3/20 |
| 40 hrs. | 31.0/700 | — | 32.3/420 | 27.4/10 |
| 80 hrs. | — | — | 26.2/300 | F** |
| 100 hrs. | 18.0/580 | — | — | — |
| 120 hrs. | — | — | 34.4/20 | — |
| 160 hrs. | 10.7/400 | — | 31.7/20 | — |
| 200 hrs. | 8.5/160 | — | — | — |

*Cross head speed 5.08 cm/min.
**Failed in 180° bend test.

The level of photostabilization is best indicated by the degree of retention of the elongation at break ($E_B$) as a function of the aging time. This is also reflected in the effect of WOM exposure on the inherent viscosity of the copolyesters. While the latter drops for Copolyester 3A from 1.66 dl/g to 1.02 dl/g after 200 WOM hours, inherent viscosity decreases for Control Polymer 3A from 1.45 dl/g to 0.26 dl/g in only 30 WOM hours.

When the procedure of this example is repeated with Stabilizer C instead of Stabilizer A or Stabilizer B, respectively, substantially the same results are obtained.

EXAMPLE 4

(A) The preparation of Copolyester A is repeated except that 1,3,5-trimethyl-2,4,6-tris(3,5-di-tert.-butyl-4-hydroxybenzyl)benzene is used instead of N,N'-hexamethylene bis(3,5-di-tert.-butyl-4-hydroxy-hydrocinnamamide). At the end of the polycondensation reaction at 250° C., the vacuum is released under nitrogen and 0.3 parts of Stabilizer A (0.5%) is added to the viscous polymer melt. After stirring for 10 min. the polymer composition is isolated in the manner described for Copolyester A.

(B) Two control polymers are prepared as described above. Control Polymer B-1 has the same composition as Copolyester 4A except bis(2,2,6,6-tetramethyl-4-piperidinyl)sebacate is substituted for Stabilizer A, and Control Polymer B-2 represents Copolyester 4A without Light Stabilizer A.

The weathering and heat aging characteristics of all three compositions are shown in Table IV.

TABLE IV

| Percent Retention of Elongation at Break ($E_B$) | Polymer | Control Polymer | Control Polymer |
|---|---|---|---|

TABLE IV-continued

| After WOM Aging* | 4A | 4B-1 | 4B-2 |
|---|---|---|---|
| 15 hrs. | — | — | 2.1 |
| 50 hrs. | 66.0 | 60.0 | F** |
| 100 hrs. | 31.4 | 8.5 | — |
| 150 hrs. | 4.5 | 2.2 | — |
| Polymer Life at 121° C.*** | | | |
| (days) | 16 | 8 | 18 |

*A retention of >5% of the original $E_B$-value (ca. 700%) is considered necessary for useful polymer properties.
**Failed in 180° bend test.
***Determined by 180° bend test.

As shown before in Example 1, only the copolyester composition of this invention exhibits a satisfactory resistance toward oxidative degradation induced by light and heat.

EXAMPLE 5

The procedure for the preparation of Copolyester 2A is repeated except that 0.12 parts of N,N'-trimethylene bis(3,5-di-tert.-butyl-4-hydroxy-hydrocinnamamide) is used in addition to Stabilizer A and N,N'-hexamethylene bis(3,5-di-tert.-butyl-4-hydroxy-hydrocinnamamide) and the amount of Stabilizer A is reduced to 0.29 parts. The resulting copolyester composition is non-blooming and exhibits a superior balance of weathering and heat aging characteristics as shown in Table V.

TABLE V

| Percent Retention of Elongation at Break ($E_B$) After WOM Aging* | |
|---|---|
| 40 hrs. | 65.7 |
| 80 hrs. | 57.1 |
| 120 hrs. | 11.4 |
| 160 hrs. | 7.1 |
| 200 hrs. | 3.5 |
| Polymer Life at 121° C.** | 7-8 weeks |

*A retention of >5% of the original $E_B$-value (ca. 700%) is considered necessary for useful polymer properties.
**Determined by 180° bend test.

The same aging results are obtained when the copolyester composition of this example is prepared in the presence of 0.24 parts of only one of the two phenolic antixoidants used above instead of 0.12 parts of each of the two stabilizers. However, in this case injection molded parts of the latter composition show obvious bloom after storage at room temperature for a few weeks.

EXAMPLE 6

The procedure for the preparation of Copolyester A is repeated with the following starting materials:

| | |
|---|---|
| Poly(propylene oxide) glycol (number average molecular weight 2100) | 31.2 parts |
| Poly(tetramethylene oxide) glycol (number average molecular weight 991) | 7.8 parts |
| Dimethyl terephthalate | 20.0 parts |
| 1,4-Butanediol | 17.5 parts |
| Trimellitic anhydride | 0.17 parts |
| N,N'-hexamethylene bis(3,5-di-tert.-butyl-4-hydroxy-hydrocinnamamide) | 0.12 parts |
| N,N'-trimethylene bis(3,5-di-tert.-butyl-4-hydroxy-hydrocinnamamide) | 0.12 parts |
| Stabilizer A | 0.3 parts |
| Catalyst | 1.4 parts |

The resulting stabilized copolyester composition as non-blooming and has an inherent viscosity of 1.35 dl/g.

TABLE VI

| Original Properties | |
|---|---|
| $M_{100}$, MPa | 5.1 |
| $M_{300}$, MPa | 7.2 |
| $T_B$, MPa | 14.5 |
| $E_B$, % | 1060 |
| Shore A Hardness | 86 |
| Inherent Viscosity, dl/g | 1.35 |

| Physical Properties After WOM Aging | $T_B$ MPa | $E_B$ % | Inherent Viscosity dl/g |
|---|---|---|---|
| 20 hrs. | 8.0 | 420 | 1.00 |
| 60 hrs. | 6.1 | 120 | 0.80 |
| 80 hrs. | 4.5 | 60 | — |
| 100 hrs. | 3.8 | 30 | 0.69 |
| Polymer Life at 121° C.* | | | |
| (days) | | 38 | |

*Determined by 180° bend test.

I claim:
1. A copolyetherester composition stabilized against oxidative degradation due to exposure to heat and light, said composition consisting essentially of a copolyetherester consisting essentially of a multiplicity of recurring long chain ester units and short chain ester units joined head-to-tail through ester linkages, said long chain ester units being represented by the formula

and said short chain ester units being represented by the formula

where G is a divalent radical remaining after the removal of terminal hydroxyl groups from a poly(alkylene oxide)glycol having a number average molecular weight of about 400–6000 and a carbon to oxygen atomic ratio of about 2.5–4.3; R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; provided said short chain ester units amount to about 15–95 percent by weight of said copolyetherester and effective concentrations of a phenolic antioxidant and a hindered amine photostabilizer of the formula

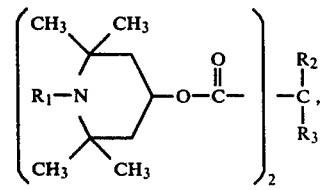

where $R_1$ represents hydrogen or an alkyl radical of 1-12 carbon atoms and $R_2$ and $R_3$ represent an alkyl radical of 1-12 carbon atoms, benzyl, or 3,5-di-tertbutyl-4-hydroxybenzyl with the proviso that at least one of $R_2$ and $R_3$ is 3,5-di-tert-butyl-4-hydroxybenzyl.

2. The composition of claim 1 wherein $R_1$ is hydrogen or an alkyl radical of 1-4 carbon atoms.

3. The composition of claim 1 wherein $R_2$ and $R_3$ are alkyl radicals of 1-6 carbon atoms, benzyl or 3,5-di-tert-butyl-4-hydroxybenzyl.

4. The composition of claim 1 wherein the photostabilizer is bis(1,2,2,6,6-pentamethyl-4-piperidinyl)n-butyl-(3,5-di-tert-butyl-4-hydroxybenzyl)malonate.

5. The composition of claim 1 wherein the photostabilizer is bis(2,2,6,6-tetramethyl-4-piperidinyl)bis(3,5-di-tert-butyl-4-hydroxybenzyl)malonate.

6. The composition of claim 1 wherein the phenolic antioxidant is N,N'-hexamethylenebis(3,5-di-tert-butyl-4-hydroxyhydrocinnamamide), N,N'-trimethylenebis-(3,5-di-tert-butyl-4-hydroxyhydrocinnamamide) or mixtures thereof.

7. The composition of claim 3 wherein the phenolic antioxidant is N,N'-hexamethylenebis(3,5-di-tert-butyl-4-hydroxyhydrocinnamamide), N,N'-trimethylenebis-(3,5-di-tert-butyl-4-hydroxyhydrocinnamamide) or mixtures thereof.

8. The composition of claim 4 wherein the phenolic antioxidant is N,N'-hexamethylenebis(3,5-di-tert-butyl-4-hydroxyhydrocinnamamide), N,N'-trimethylenebis-(3,5-di-tert-butyl-4-hydroxyhydrocinnamamide) or mixtures thereof.

9. A process for producing the stabilized copolyetherester composition of claim 1 which comprises reacting said poly(alkylene oxide)glycol, said dicarboxylic acid and said diol in the presence of effective amounts of a phenolic antioxidant that is stable and substantially nonvolatile during polymerization and a hindered amine photostabilizer having the formula:

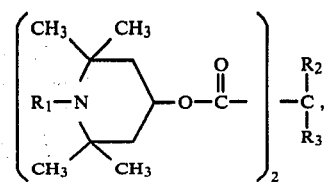

where $R_1$ is hydrogen or an alkyl radical containing 1-12 carbon atoms; $R_2$ and $R_3$ are alkyl radicals containing 1-12 carbon atoms, benzyl or 3,5-di-tert-butyl-4-hydroxybenzyl with the proviso that at least one of $R_2$ and $R_3$ is 3,5-di-tert-butyl-4-hydroxybenzyl.

10. The process of claim 9 wherein $R_1$ is hydrogen or an alkyl radical of 1-4 carbon atoms.

11. The process of claim 9 wherein $R_2$ and $R_3$ are alkyl radicals of 1-6 carbon atoms, benzyl or 3,5-di-tert-butyl-4-hydroxybenzyl.

12. The process of claim 9 wherein the photostabilizer is bis(1,2,2,6,6-pentamethyl-4-piperidinyl)n-butyl-(3,5-di-tert-butyl-4-hydroxybenzyl)malonate or bis(2,2,6,6-tetramethyl-4-piperidinyl)bis(3,5-di-tert-butyl-4-hydroxybenzyl)malonate.

13. The process of claim 9 wherein the phenolic antixoidant is N,N'-hexamethylenebis(3,5-di-tert-butyl-4-hydroxyhydrocinnamamide), N,N'-tri-methylenebis-(3,5-di-tert-butyl-4-hydroxyhydrocinnamamide) or mixtures thereof.

* * * * *